United States Patent [19]
Webber

[11] 4,448,624
[45] May 15, 1984

[54] METHOD AND APPARATUS FOR MAKING FILAMENT WOUND CYLINDRICAL STRUCTRES

[75] Inventor: Robert C. Webber, Marietta, Ga.

[73] Assignee: Lockheed Corporation, Burbank, Calif.

[21] Appl. No.: 474,441

[22] Filed: Mar. 11, 1983

[51] Int. Cl.³ .................. B65H 81/00; B41B 11/00
[52] U.S. Cl. .................................. 156/175; 156/425; 249/163; 425/436 RM
[58] Field of Search ............... 156/169, 173, 175, 184, 156/425, 417; 249/63, 64, 67, 160, 163, 164, 249, 165, 166; 425/436, 436 RM, 441, 28 R, 34 B; 242/115

[56] References Cited

U.S. PATENT DOCUMENTS

| | | | |
|---|---|---|---|
| 2,749,266 | 6/1956 | Eldred | 156/175 |
| 3,341,387 | 9/1967 | Boggs | 156/175 |
| 3,367,815 | 2/1968 | Ragettli et al. | 156/175 |
| 4,021,014 | 5/1977 | Craig | 249/164 |
| 4,137,950 | 2/1979 | Briscall | 156/175 |

FOREIGN PATENT DOCUMENTS 712253  6/1980  U.S.S.R. ............... 156/425

*Primary Examiner*—Michael W. Ball
*Attorney, Agent, or Firm*—John J. Sullivan

[57] ABSTRACT

An apparatus and method is disclosed for the fabrication of cylindrical structures (26) by filament winding of resin impregnated filaments around a novel cylindrical mandrel assembly (10) whereby the mandrel assembly (10) and fabricated cylindrical structure (26) are easily separated after curing of the resin impregnated materials.

The invention utilizes an inner, hollow cylindrical mandrel member (11) onto which a metal cable (12) is wound over afterwhich segmented outer mandrel sections (13) are connected to the inner mandrel member by fastener devices (20) installed from the inner side of the inner mandrel member (14). The resin impregnated filament is then wound over the outer mandrel segments (13) and cured in a conventional manner. After curing, the fasteners (20) are removed from the inner side of the inner mandrel (11), and the cable (12) is removed by pulling it from one end of the mandrel assembly (10). With the cable (12) removed, clearance is provided so that the inner mandrel (11) can be removed from the outer segmented mandrel (13), and once the inner mandrel (11) is removed, the outer, segmented mandrel (13) is disassembled and removed inwardly from contact with the cured filament wound cylinder (26).

5 Claims, 10 Drawing Figures

METHOD AND APPARATUS FOR MAKING FILAMENT WOUND CYLINDRICAL STRUCTRES

TECHNICAL FIELD

This invention pertains to a cylindrical mandrel assembly and use thereof, and more particularly to the details of a mandrel assembly and the method of use thereof in the fabrication of filament wound cylindrical structures from resin impregnated filaments.

BACKGROUND ART

Mandrels are used for fabrication of cylindrical structures by winding resin impregnated filaments around the mandrel, which is the process commonly known as filament winding. After winding, the resin is cured (usually by heating) thereby producing a filament wound cylinder of some rigidity that is rather tightly secured or contained on the mandrel so as to almost constitute a case of adherence of the cured cylinder to the mandrel. Prior art attempts to facilitate the removal of cured, filament wound cylindrical sections from the mandrels on which they are wound include the use of breakaway (disposable) mandrels, or other mandrel extracting schemes of much more complexity; both of which involve a substantial recurring expense whether it be for replacement of disposable mandrels or for manhours in the use of complex mandrel systems.

DISCLOSURE OF THE INVENTION

This invention provides a mandrel assembly comprising a pair of concentric cylindrical structures separated by a helically wound steel cable therebetween with the outer structure upon which the filament is wound being segmented. By the expediency of pulling the cable axially from between the concentric structures after cure of the wound filament, a clearance between the concentric cylindrical structures is achieved to facilitate removal of the inner cylindrical structure followed by removal of the outer structure segments. Thusly, the objects and advantages of a fast, simplistic and inexpensive apparatus and method for removing filament wound cylindrical sections from the mandrels on which they are wound are attained.

In addition, other objects and advantages are presented in that the apparatus elements are reusable to provide for repeatability in the internal configurations of filament wound cylindrical sections; and, by the selective choice of various shaped segments for the outer cylindrical structure, varying internal configurations of filament wound cylindrical sections may be readily achieved.

BEST MODE OF CARRYING OUT THE INVENTION

Figure 1:
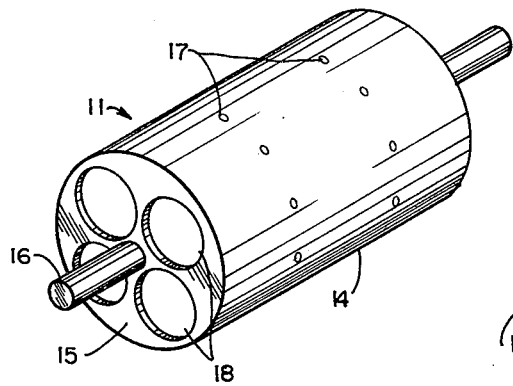
FIGS. 1 through 3 are perspective views of the apparatus of this invention in progressive stages of assembly thereof.
Figure 2:
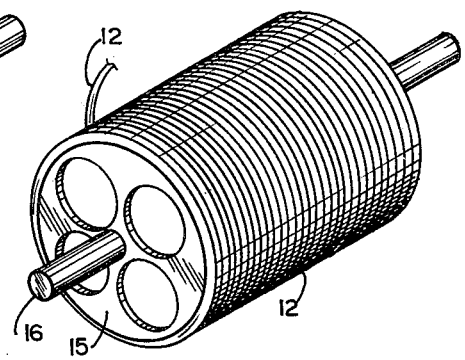

Referring to FIGS. 1,2,3,7 and 8, the invention utilizes a mandrel assembly 10 (FIG. 3), comprised of an inner mandrel structure 11 (FIG. 1) with a metallic cable 12 wrapped therearound in a single layer (FIG. 2), and a plurality of outer mandrel segments 13 (FIG. 3) secured to the inner mandrel structure 11 with the cable 12 therebetween to form the mandrel assembly 10.

The inner mandrel structure 11 comprises a hollow, cylindrical member 14 having end plates 15 and a spindle or axle 16 affixed to the end plates 15 so as to permit a unitary rotation thereof. A plurality of small openings or passages 17 are located circumferentially around cylindrical member 14 for purposes which will be explained in more detail hereinafter, and a plurality of substantially larger openings or passages 18 are located in end plates 15 for purposes which will also be explained in more detail hereinafter.

Figure 7:
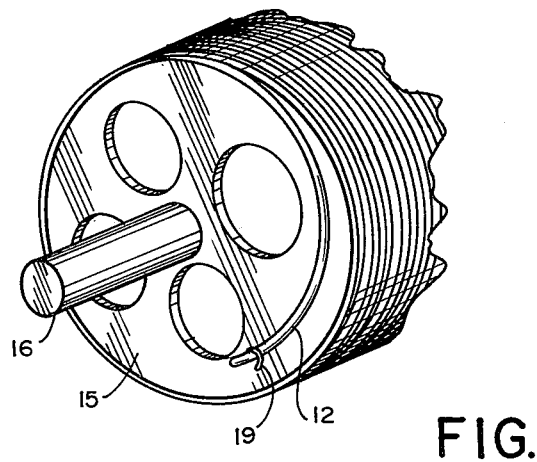
FIG. 7 is an enlargement for clarity purposes of a portion of FIG. 2.

For assembling the mandrel assembly 10, a metallic wire or cable 12, preferably of a $\frac{1}{8}$" or 3/16" diameter, is wound around cylindrical member 14 in a single-layer, helical manner with each opposite end of cable 12 secured or connected to its corresponding end plate 15 by a clamp means 19 as best seen in FIG. 7. Such helix winding of cable 12 is of sufficient pitch to permit an occasional spacing between adjacent wraps of cable 12 for purposes explained in more detail hereinafter.

Figure 8:
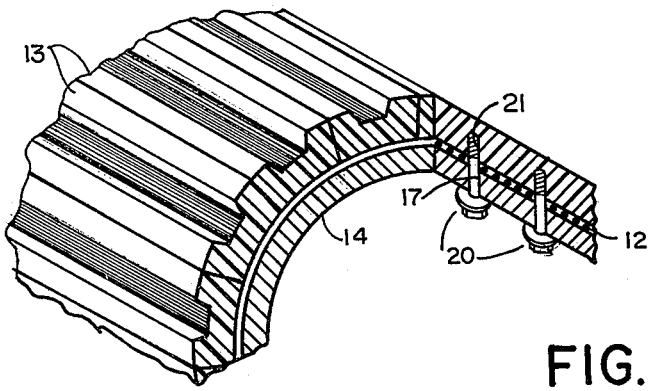
FIG. 8 is a partial cut-away view showing details of assembly of the assembly of FIG. 3.

Completion of mandrel assembly 10 is accomplished by the connection of outer mandrel segments 13 to the inner mandrel structure 11 by bolts 20 extending through the small openings or passages 17 in cylindrical member 14 and into threaded passages 21 in each of the outer mandrel segments 13 as best seen in FIG. 8. Because the bolts 17 extend through the radial thickness of the circumferentially wrapped cable 12 to mount the outer mandrel segments 13 to cylindrical member 14 forming a part of the inner mandrel structure 11, hence the purpose of providing sufficient pitch to the helical winding of cable 12 to permit spacings between various adjacent wraps of cable 12 occasioned by the extension of the bolt members 20 therebetween. Access to the interior of the inner mandrel structure 11 for the installation of bolts 20 through the small passages 17 in cylindrical member 14 is through the large openings or passages 18 in end plates 15.

Figure 3:
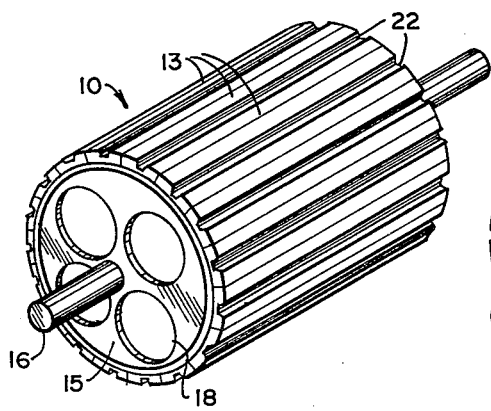

Upon completion of the mandrel assembly 10 as seen in FIG. 3, it is to be recognized the assembled tooling apparatus of this invention is now ready to serve as the mandrel for the fabrication of a filament wound, composite cylindrical section 26. The outer surface of the outer mandrel segments 13, which will determine the inner diameter of the filament wound, composite cylindrical section, may be perfectly smooth and continuous, or otherwise shaped so as to permit inclusion of integral stiffening structural members on the interior of an integrally stiffened filament wound cylindrical section. For example, as shown in FIG. 3 and 8, the outer mandral segments 13 may be shaped to provide longitudinal grooves 22 into which prior fabricated longitudinal hat sections 23 (FIG. 9) may be located around which the filament is wound; the hat sections 23 becoming an integral part of the final cured structure 26 by the use of an appropriate adhesive applied to the surfaces of the hat sections 23 that will contact the filament wound cylindrical section. Likewise, should annular strengthening ribs be desired to be integrated with the filament wound cylindrical section 26, annular grooves may be formed in the outer surfaces of the outer mandrel segments 13 wherein separate filament windings may be placed before winding takes place for the cylindrical section 26.

Figure 9:
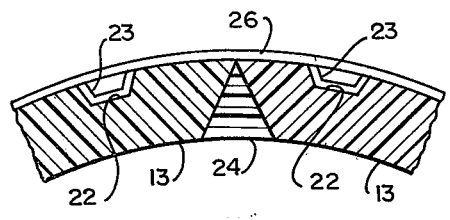
FIG. 9 is a partial cut-away view showing details of a portion of the apparatus of one embodiment of this invention preparatory to its removal from a filament wound cylindrical structure formed according to this invention; and, FIG. 10 is similar to FIG. 9 showing a second embodiment of a portion of the apparatus of this invention.

Referring now to FIG. 9, a pair of adjoining outer mandrel segments 13 have their confronting side surfaces modified to permit a keystone or spacing member 24 to be inserted therebetween; member 24 serving to facilitate disassembly and removal of the outer mandrel segments 13 from the filament wound cylindrical section 26 after cure thereof as explained below in the operation of the invention.

Figure 10:
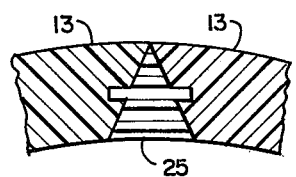

FIG. 10 shows a modification of that shown in FIG. 9 in that the cross-sectional shape of insert 25 consists of an arrangement whereby a positive tongue-and-groove engagement between insert 25 and the adjacent segments 13 is retained until insert 25 is forcibly removed in the same functional manner as for member 24 in FIG. 9.

INDUSTRIAL APPLICABILITY

In practice of the invention, mandrel assembly 10 is assembled by the wrapping of cable 12 around inner mandrel structure 11, securing the ends of cable 12 to their respective end plates 15 by clamp means 19, and then mounting the outer mandrel segments 13 to inner mandrel structure 11 with bolts 20; all in the manner explained above.

Figure 4:
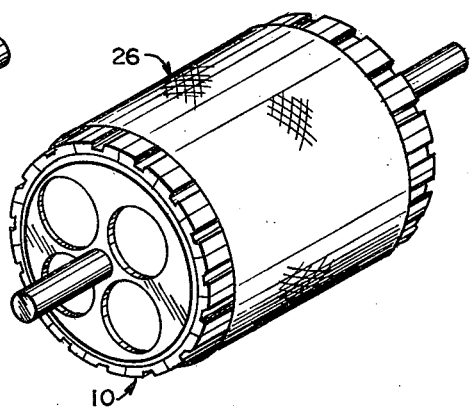
FIGS. 4 through 6 are perspective views of the apparatus of this invention in progressive stages of disassembly thereof for removal of a filament wound cylindrical section therefrom.

Next, the mandrel assembly 10 is utilized as the base for winding resin-impregnated filament therearound in any appropriate or desired geometry and quantity of layers to form a filament wound cylindrical section 26 thereon as shown in FIG. 4. In the case of fabrication of section 26 with integral, longitudinal hat sections 23, such winding takes place after placement of hat sections 23 in any appropriate retentional manner in longitudinal grooves 22; such hat sections being of either completely cured or partially cured structures as desired or appropriate. Likewise, in the case of section 26 being fabricated with integral, annular ribs, filament winding in appropriate annular grooves in the outer surfaces of outer mandrel segments 13 occurs prior to the final outer winding for section 26.

After such final winding for section 26, the resin is air or temperature cured in any appropriate manner to provide a solidified filament wound structure 26 in cured state and of the desired configuration; e.g., purely cylindrical or cylindrical with integral stiffening members.

Figure 5:
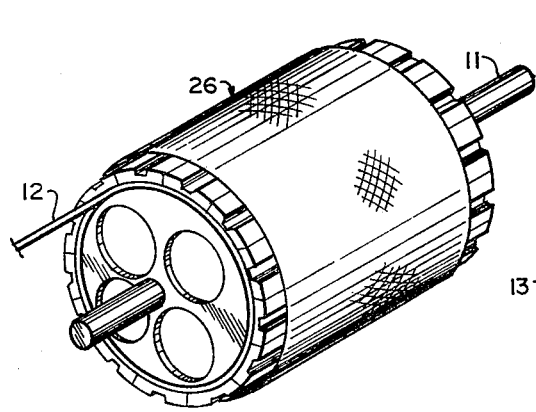
Figure 6:
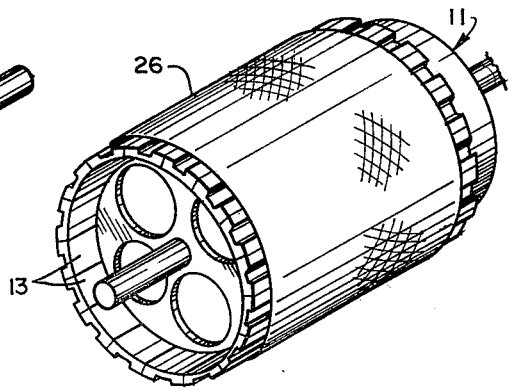

Removal of mandrel assembly 10 from the cured cylindrical section 26 is begun by removal of bolts 20 from the interior of inner mandrel structure 11 whereupon cable 12 is free to be withdrawn by pulling or winching from between the hollow cylindrical member 14 and the assembled outer mandrel segments 13 as shown in FIG. 5. After the cable 12 is completely withdrawn, the inner mandrel structure 11 is freely separable from inside of the assembled outer mandrel segments 13 as shown in FIG. 6 due to the radial clearance therebetween now established by cable 12 having been removed. Thereafter, removal of the spacer member 24 (FIG. 9) or insert 25 (FIG. 10) will permit removal of the various outer mandrel segments 13 from within the cured filament wound cylindrical section 26 whereby the finished section 26 is free of all fabrication tooling.

Thusly, it can be seen that the invention as described provides a fast, simplistic and reusable apparatus and method for making and removing filament wound cylindrical sections of substantially any size and of variable configurations from the mandrels on which they are wound.

It is to be understood that the foregoing disclosure is illustrative of preferred embodiments of the invention. Various changes and modifications to these embodiments will suggest themselves to those skilled in the art without departing from the true spirit and scope of the invention as set forth in the appended claims which alone define the true limitations of this invention.

What is claimed is:

1. The method of fabricating a resin-impregnated filament wound cylindrical section comprising the steps of:
   (a) wrapping a single layer of metallic wire around the cylindrical surfaces of a hollow cylindrical mandrel having a plurality of radial openings therein, the pitch of said wrapping of wire on the mandrel being sufficiently great to permit intermediate spacings between at least some of the adjacent wraps of the wire;
   (b) connecting each end of the wire to its respective end of said mandrel;
   (c) mounting a plurality of axially extending elongated segments to said hollow cylindrical mandrel by fastening means extending through said radial openings and between a pair of adjacent wraps of said wire and into engagement with said segments whereby said segments are held in contact with said wrapped wire and whose outer surfaces form a winding mandrel surface;
   (d) winding a resin-impregnated composite filament on said winding mandrel surface into a wound cylindrical configuration as desired;
   (e) curing the cylindrically wound composite filament while still contained on the mandrel surface;
   (f) remove the fastener means retaining the elongated segments to said hollow cylindrical mandrel;
   (g) disconnect both ends of the wire from the hollow cylindrical mandrel and pull the wire from between the hollow cylindrical mandrel and the elongated segments;
   (h) separate the hollow cylindrical mandrel and the elongated segments still containing the filament wound cylindrical section in cured state;
   (i) and remove the elongated segments from within the filament wound cylindrical section.

2. The method of fabricating a resin-impregnated wound cylindrical section as claimed in claim 1 including the additional step between steps (c) and (d) of:
   placing in receptacles in outer surfaces contained in said outer segments materials that will become integrated with the final fabricated cylindrical section as stiffening members thereof;
   and modifying step (d) of claim 1 to wrap the filament around both the winding mandrel surface and the stiffening member materials.

3. A mandrel assembly for the fabrication of a resin-impregnated filament wound cylindrical section, said assembly comprising:
   a hollow inner mandrel means providing a smooth outer cylindrical surface with a plurality of radial openings through the cylindrical wall of the inner mandrel means;

a metallic wire means wound helically in a single layer around said inner mandrel means with each opposite end of the wire means secured to its respective end of said inner mandrel means, the pitch of said wire means winding being sufficiently great to permit intermediate spacings between at least some of the adjacent wraps of said wire means;

and an outer mandrel means comprised of a plurality of elongated segments adapted to be connected to said inner mandrel means by a plurality of fastening means that can be extended through said cylindrical wall openings in said inner mandrel means and between adjacent wraps of said wire means into engagement with said outer mandrel segments;

the outer surface of the outer mandrel means shaped to provide a winding surface for the resin-impregnated filament being wound into a cylindrical section whereby when the filament cylindrical section is cured the mandrel assembly may readily be removed from the cured cylindrical section by disassembly of the mandrel assembly and removal therefrom.

4. A mandrel assembly as claimed in claim 3 wherein at least some of the outer surfaces of said outer mandrel segments are configured to provide receptacles for location of materials that will become integral stiffening members of the final cured cylindrical section.

5. A mandrel assembly as claimed in claim 3 wherein said outer mandrel means further includes an interengaging spacing member between an adjacent pair of segments for retention of said outer mandrel means in an annular assembled configuration until removal of said spacing member from engagement with said adjacent pair of segments.

* * * * *